US006162984A

United States Patent [19]
Engard

[11] Patent Number: 6,162,984
[45] **Date of Patent: *Dec. 19, 2000**

[54] LINEARLY-POSITIONAL, MULTI-CONFIGURATIONAL, STRINGED MUSICAL INSTRUMENT PICKUP

[76] Inventor: John Michael Engard, 225 A Spanish Trail, Rochester, N.Y. 14612

[ * ] Notice: This patent issued on a continued prosecution application filed under 37 CFR 1.53(d), and is subject to the twenty year patent term provisions of 35 U.S.C. 154(a)(2).

[21] Appl. No.: 09/057,112

[22] Filed: Apr. 8, 1998

[51] Int. Cl.[7] ................................ G01H 1/32; G01H 3/18

[52] U.S. Cl. ................................ 84/743

[58] Field of Search ..................... 84/646, 722, DIG. 30, 84/615–620, 653–658, 678–690, 723–746

[56] References Cited

U.S. PATENT DOCUMENTS

| | | | |
|---|---|---|---|
| 2,334,744 | 11/1943 | Benioff | 84/731 X |
| 2,964,985 | 12/1960 | Webster | 84/726 X |
| 3,869,952 | 3/1975 | Rowe | 84/727 |
| 3,911,777 | 10/1975 | Rendell | 84/743 |
| 4,142,435 | 3/1979 | Pozar . | |
| 4,177,705 | 12/1979 | Evangelista | 84/DIG. 30 |
| 4,730,530 | 3/1988 | Bonanno | 84/724 |
| 4,869,144 | 9/1989 | Lieber . | |
| 4,941,389 | 7/1990 | Wendler | 84/727 |
| 5,040,447 | 8/1991 | Murata et al. | 84/722 X |
| 5,140,887 | 8/1992 | Chapman | 84/646 |
| 5,398,585 | 3/1995 | Starr | 84/646 |

*Primary Examiner*—Stanley J. Witkowski

[57] ABSTRACT

A linearly-positional, multi-configurational stringed musical instrument pickup as shown provides a mechanism by which one or more single-string musical instrument pickups,also known as signal sensors, each with its own output, may be repositioned to any desired point beneath the length of the string of a musical instrument between the bridge and the fingerboard (or neck), if present. The single-string pickups or signal sensors being wired in series with one another in any desired combination or left to be amplified as individual, independent signals. The signal sensors themselves are completely removable from the device to allow sensors of other types to be interchanged.

3 Claims, 6 Drawing Sheets

LINEARLY-POSITIONAL, MULTI-CONFIGURATIONAL, STRINGED MUSICAL INSTRUMENT PICKUP

BACKGROUND

Several devices have been invented for the purpose of amplifying a stringed musical instrument. These signal sensing devices, called pickups, convert either the wave motion of the vibrating string when played or the oscillating electrical field generated by a vibrating metallic string in a magnetic field into an electrical signal which can be amplified electrically.

The first type, called a transducer, is simply a miniature microphone which converts either the vibration of the air beneath the moving string or the vibrations within the material of the instrument into an electrical signal. This signal is then transmitted to the amplifier or signal processor by wire or by a radio transmitter.

The other common form of pickup is essentially a radio antenna. Beneath the set of strings to be amplified is a magnet or pair of magnets wrapped in loops of wire. When a metallic string vibrates above and within the magnetic field this induces an oscillating electrical field in the loops of wire and this electrical signal can also be sent by wire or radio to an amplifier for amplification.

These devices share the following characteristics: They are placed beneath the strings and the top surface of the instrument, usually between the fingerboard and the bridge of the instrument, in some cases they are attached directly to the bridge itself and the instrument may have to be physically altered to install the device.

The output of these devices is a composite of the various pitches produced by one or more strings as the string(s) vibrate, that is , the signal which ultimately gets amplified or processed arrives at the amplifier or processor as one discrete sound or signal.

These devices are stationary. Once installed, repositioning may be viewed as re-installing. Some manufacturers even specify the relative position between the fingerboard and bridge for which their pickup has been designed. There is no independent positioning on a per-string basis, that is, to exploit the tonal characteristics of another point on one string requires repositioning the pickup. Since all of the strings have different tonal characteristics at any given point, exploiting the desired tone of one string requires that the same position along the length of the entire stringset be exploited as well without regard to whether or not the other tones are desired. Traditionally, the only way to address this fact is to install one or more additional pickups at other lengths along the stringset and to use an electrical switch to activate/deactivate other pickups.

The linearly-positional, multi-configurational stringed musical instrument pickup (hereafter referred to as "pickup" or "mechanism") differs from the pickups described above as detailed in the Summary section of this application.

DETAILED DESCRIPTION OF PREFERRED EMBODIMENT

Figure 1:
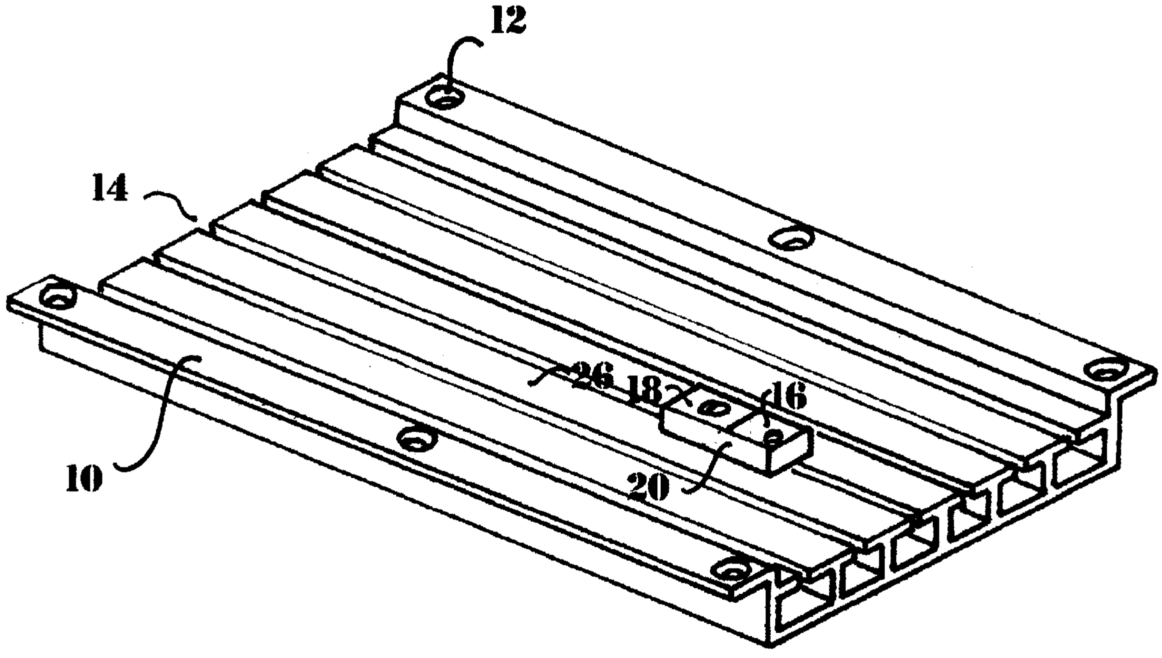
FIG. 1 is an oblique view of the top of the mechanism.

FIG. 1 depicts how this mechanism would appear as to accommodate an instrument with six strings with one track (14) per string. Preferably, the instrument is a guitar, however, other stringed instruments could employ this mechanism. A track (14) is positioned beneath and parallel to the string to be amplified. (Only one track of the mechanism is shown to have a positional, single-string pickup (20) in place.The base for item (20) in FIG. 7. The intent of the design is to have at least one such pickup per track.) The single-string pickup can be positioned at any point along the length of the track in which it sits.

This illustration depicts a flange (10) at both the forefront and at the opposite side of the mechanism. Each flange is depicted as having three holes (12) through which screws or other fastening units could be applied to secure the mechanism to the instrument. The actual number of holes is irrelevant, it being the intent of the author to demonstrate a method by which to secure the mechanism. The actual number of holes would vary from instrument to instrument. Though less desirable, the mechanism could be glued or epoxied to the instrument as well. Also, the flanges can be placed in such a way as to minimize the amount of adjustment necessary to the single-string pickups for optimal sensitivity to string vibration. Therefore, even though they are depicted as rising above the tracked surface, they may be oriented differently for some instruments.

From the forefront of the depiction of FIG. 1, a single-string pickup (20) is shown in the third track (14). The upper surface of the pickup shows two distinct features. On the left-hand side, the head of a regular screw (18) is visable. This screw is magnetized and a part of the magnet and can be adjusted with a screwdriver to the desired proximity to the string. (Signal-sensing devices not magnetically driven may not require the presence of such a screw.)

A smaller set-screw (16) is shown in the right forefront of the pickup (20). The purpose of this small screw is to tighten the pickup into place such that the pickup will not shift while the instrument is played or in transport. The set-screw passes through a hole, preferably threaded, on the housing for the single-string pickup (20) and then comes into contact with the top surface (26) of the multi-tracked positional mechanism. This is only one way to accomplish this stability. Various alternative methods by which this gets accomplished are readily available.

Also, the depiction suggests the track mechanism is approximately rectangular with parallel tracks therein. The concept is intended to convey that the spatial relation from one track to another is dictated by the placement of the strings on the instrument as well as the available length along each string for placement of a single-string pickup. Therefore the actual shape of the entire mechanism will vary between different types of instruments.

Preferably, the material best suited for construction of the tracked mechanism and the housing for the single-string pickups is non-conductive, i.e., plastic, fiberglass, or perhaps wood. Not clearly represented in FIG. 1 is the part of the housing for the single-string pickup beneath the tracked surface. This is described later in this document.

Figure 2:
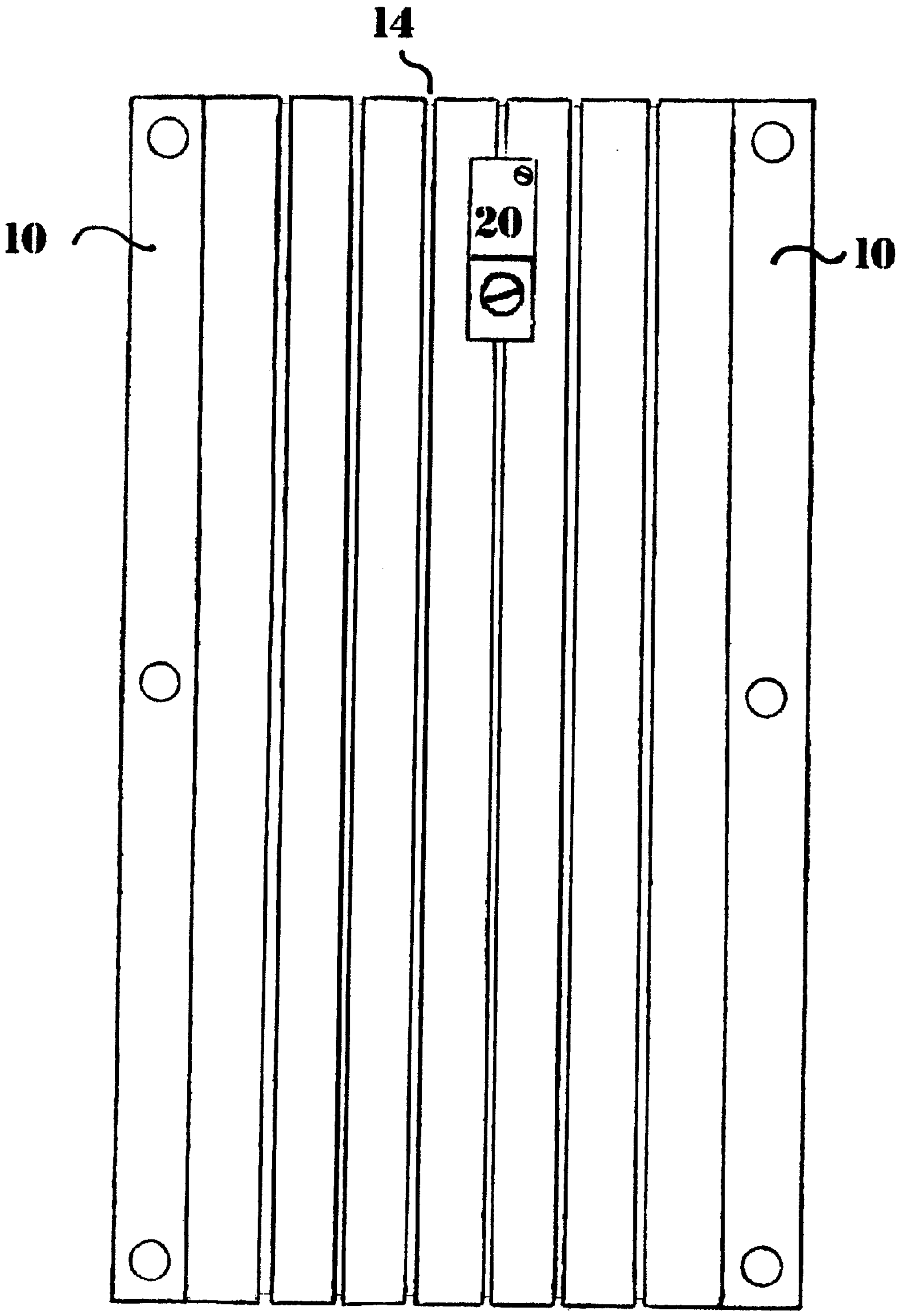
FIG. 2 is a top view, thereof.

FIG. 2 shows a top view of the mechanism, again only one single string pickup (20) is shown, however there would be at least one per each of the six tracks. Like FIG. 1, this particular version would suit an instrument with six parallel strings, but the concept is not restricted to this configuration. In a six-stringed instrument with a fingerboard, this could be installed between the neck and the bridge of the instrument. Either end of the depiction is oriented toward the neck or the bridge without change or alteration to function.

Figure 3:
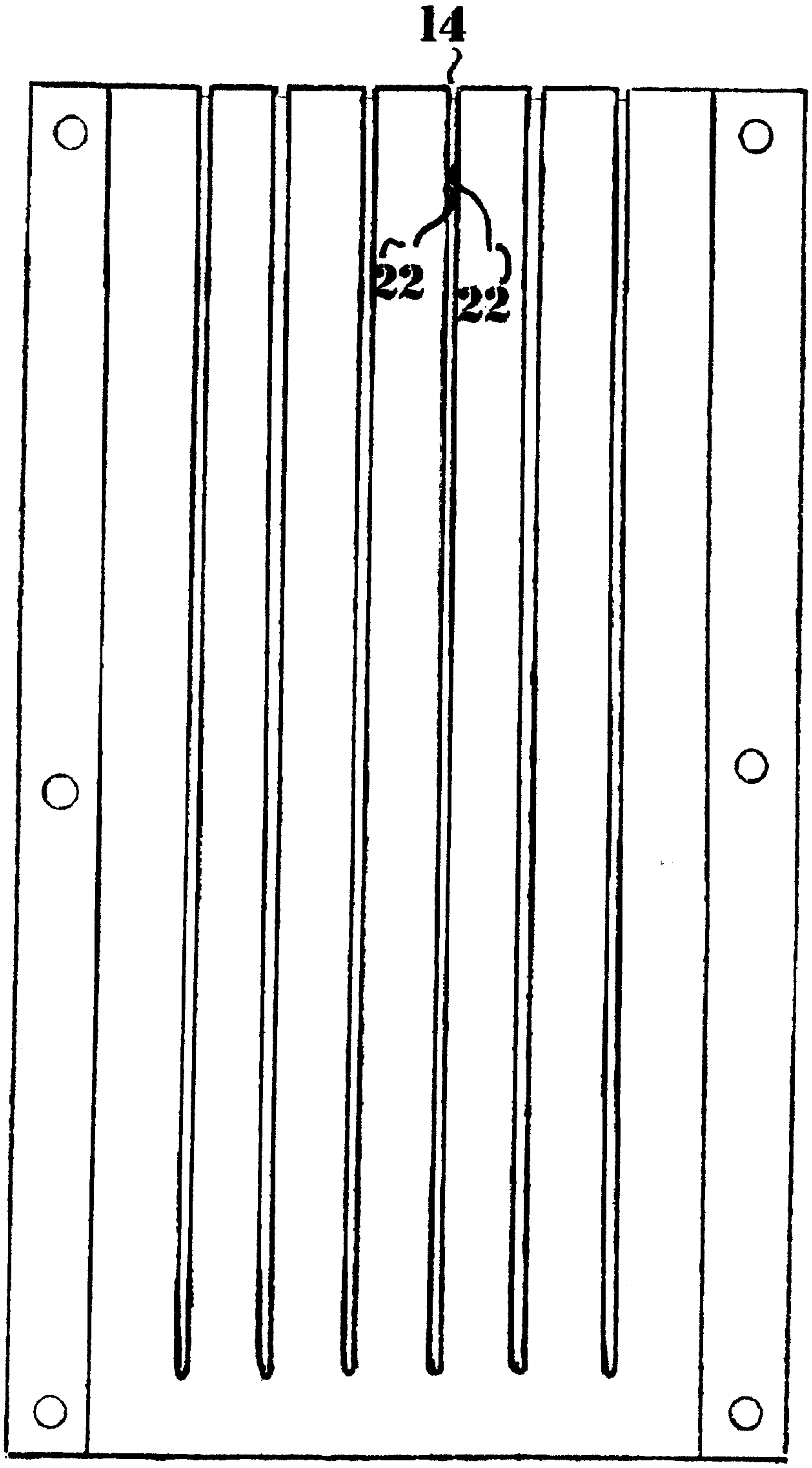
FIG. 3 is a bottom view, thereof.

FIG. 3 depicts a bottom view of the mechanism. At one end of the bottom, the tracks are open, at the other end, closed. (It is not necessary that this closure occurs at one end or the other specifically. For all of the tracks to be held together in one cohesive unit, the material between tracks must be joined at some point. If this connection occurs at one end or the other, loading the mechanism with the single-string pickups is simply more convenient.) Again, track number 3 (14) which features the single-string pickup (20) is depicted as having two wires (22) protruding from the bottom, one labelled "+" for positive and one labelled "−" for negative. Each is one end of the wire (22) which is wrapped around the magnet. Other signal sensors, which may operate on a different principle, may have some other number of connections present. For example, some instruments strung with non-metal strings are amplified with pickups that operate as small microphones beneath the stringset. The single-string pickups would then merely be more of the transducer-style mentioned in the background section of this application and the number of connection wires may be different. The concept presented here would remain just as applicable.

When the mechanism is used to employ more than one unit of a given type of single-string pickup, the pickups can be wired in series from one to another, in any grouping desired and in other multiples, or not at all, that is, each single-string pickup gets connected to its own amplification or signal processing device.

Figure 4:
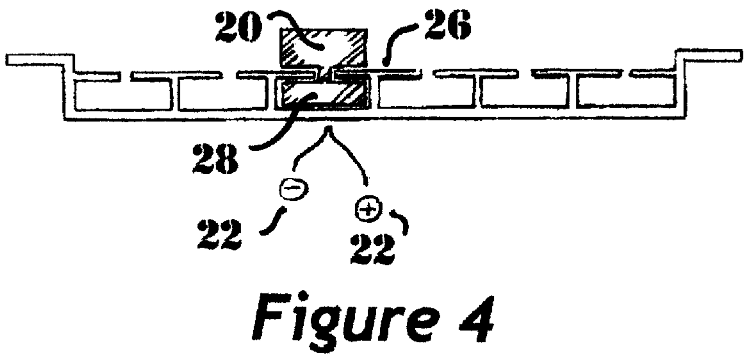
FIG. 4 is an instrument-fingerboard view thereof.

FIG. 4 is a view lengthwise down the mechanism such that the tracks are oriented directly down the line-of-sight to the viewer. As referred to earlier in this application, the single-string pickup (20) is attached to a small block (28) beneath the top surface (26) of the mechanism. The block to which the single-string pickup is attached fits snuggly into the channel in which it glides so as to minimize any error in the proper allignment of the signal sensing field or pickup pattern beneath the string. Protruding from the bottom of the mechanism are the ends of the connecting wire (22) which from the single-string pickup above the surface. Again, at least one pickup is intended per track.

Figure 5:
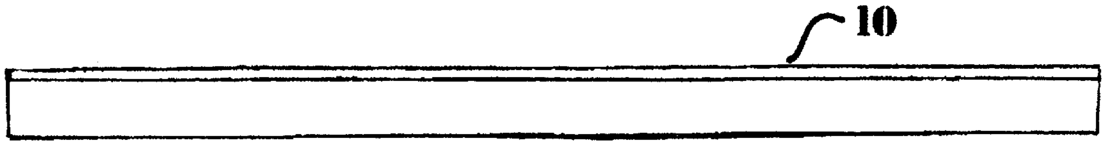
FIG. 5 is a side view, said view being identical to the opposite side.

FIG. 5 is merely the image in FIG. 4 rotated ninety degrees in the horizontal plane. From this perspective there is practically no detail to describe which has not already been addressed. The opposite side of the mechanism appears indentical. The upper surface of single-string pickup is situated below the mounting flange (10) and is therefore not visible from this perspective. In application, some part of this pickup may be visible from this perspective depending upon how the user configures or adjusts the pickup. When installed in the instrument, the various wires from each single-string pickup would preferably protrude beneath the mechanism.

Figure 6:
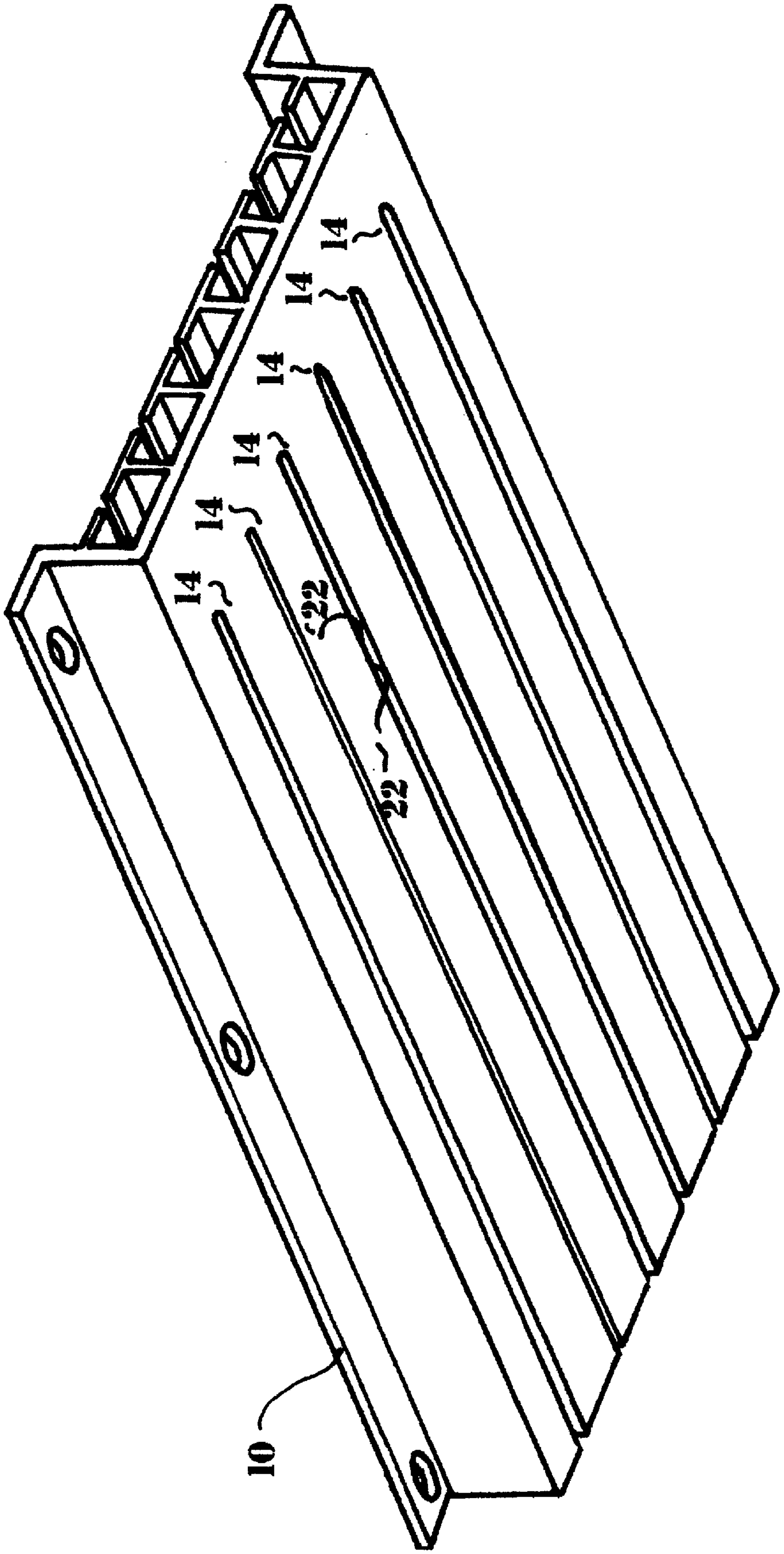
FIG. 6 is an oblique view of the bottom .

FIG. 6 depicts the underside of the mechanism by rotating the image in FIG. 1 in the vertical plane by approximately ninety degrees. The view clearly shows six tracks (14) through which connections (22) for each single-string pickup can pass and move with the pickup as it positioned.

Figure 7:
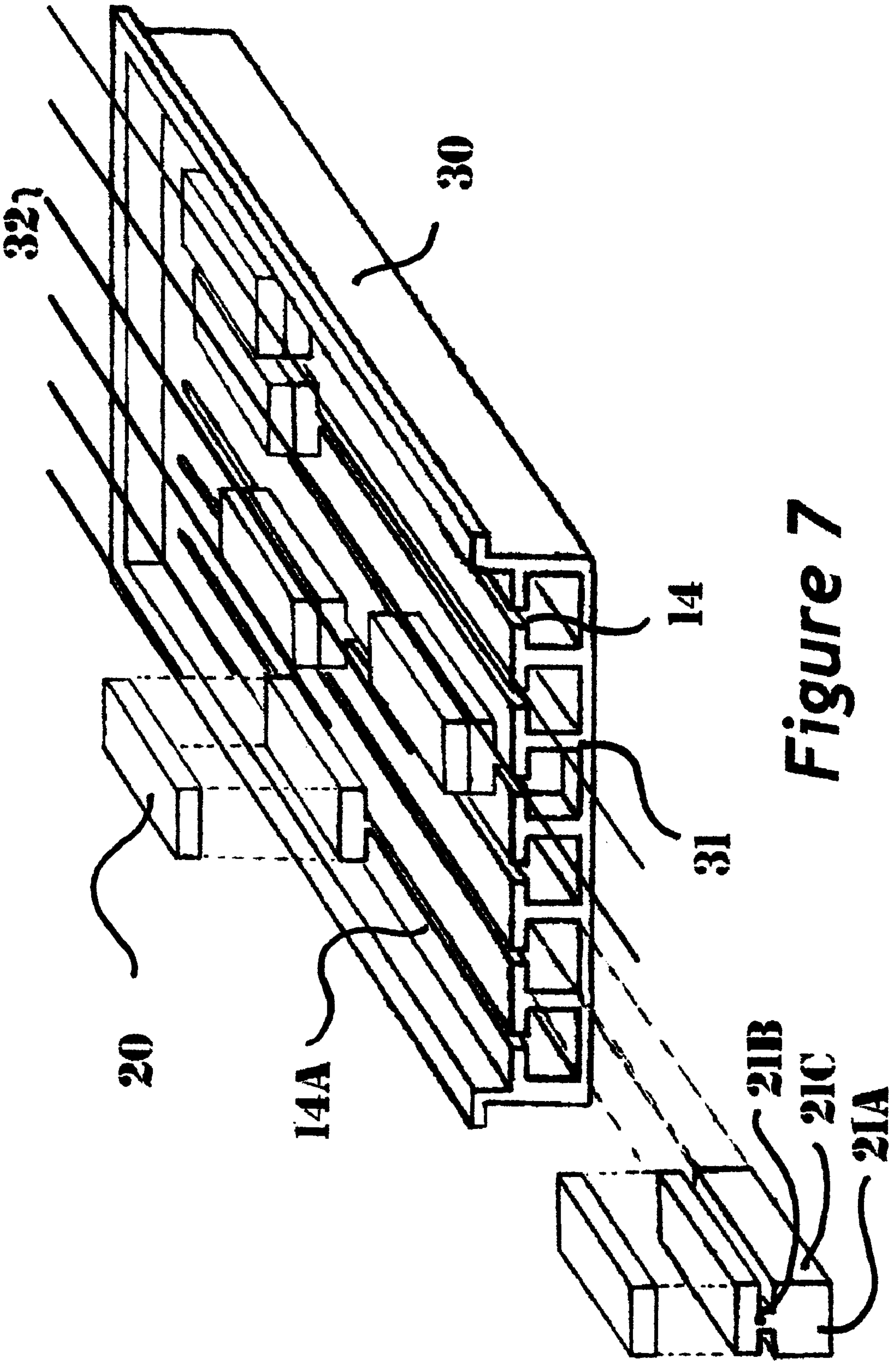
FIG. 7 is an oblique view of the device showing the orientation of the device to a set of strings, an exploded view of components which can be moved within and on top of the chassis, and components which can be removed from the device.

FIG. 7 depicts several relationships; how the device is oriented in a plane roughly parallel to the plane of a set of strings (32) on a musical instrument, how the base (21*a*) for each sensor (20) is comprised of two physically distinct and adjoining sub-components (21*c*), a block and (21*b*), a T-shaped element; that element (21*c*) is slideably disposed within the chassis (30) and that the T-shaped element (21*b*) adjoining (21*c*) is found, in part, within a track (14) and, in part on the top surface of the trackbed (14*a*); that component (20), the actual mechanism of energy conversion, is separable from its base (21*a*); how the possible range of motion of a given base is restricted to the volume of space within which it is slideably disposed and how the tracks (14) of the top surface (trackbed (14*a*)) guide the base as it is moved to different positions on its long axis.

What is claimed is:

1. A pickup assembly for stringed musical instruments comprising: a six-sided, rectangularly shaped chassis (30) with one side being not completely closed so as to afford access to any subdivision of space within the interior, the total interior space being subdivided lengthwise by a plurality of partitions (31), the partitions defining volumes of space which are approximately parallel to one another and which are of similar dimension, each subdivision of interior space having a center axis oriented lengthwise and parallel to the plane between this axis and the long axis of a string (32) in tension immediately adjacent to, and outside of, this partition of space, the interior partitions (31) not serving as structural support for the chassis;

a surface of the chassis (30) closest to the plane of the instrument's strings (32) being a closed surface except for the presence of one lengthwise opening of uniform width associated with each interior subdivision of space within the chassis, each opening on this surface being parallel to the long center axis of the interior partition of space with which it is associated, these openings of uniform width being referred to as tracks (14) and the surface comprising a plurality of tracks being referred to as a trackbed (14*a*);

a plurality of blocks (21*a*), comprised of two parts, (21*b*) and (21*c*), the length of each block being shorter than the length of the volume of space defined by the partitions (31) within the chassis (30) but whose respective width is approximately equal to any of these volumes of space, at least one block (21*a*) being slideably disposed per interior volume of space within the chassis (30) as well as per string (32) of the associated instrument; there being a T-shaped structure (21*b*) atop and connected to each block (21*c*) such that the vertical element of the T-shaped structure (21*b*) fits within a track (14) and the horizontal aspect of the T-shaped element (21*b*) is situated flush with the exterior surface of the trackbed (14*a*); manual or mechanical movement of the T-shaped structure (21*b*) causing subsequent repositioning of its associated block (21*c*) within the chassis (30), range of motion of the T-shaped structure (21*b*) and the block (21*c*) to which it is attached being limited to a line parallel to the center axis of the volume of space within which the block shaped element (21*c*) is slideably disposed; a second block-shaped component (20) which attaches to the surface of the horizontal aspect of each T-shaped component (21*b*) closest to the associated string; this second block (20) being a signal sensor.

2. The device as defined in claim 1 wherein there exits at least a one-to-one correspondence of signal-sensors (20) to associated strings (32).

3. The device as defined in claim 1 wherein the secondary blocks (21*a*) supporting the signal sensors (20) attach in such a way as to not require handtools to attach the secondary block to the T-shaped component (21*b*).

* * * * *